(12) United States Patent
Udagawa et al.

(10) Patent No.: US 9,968,187 B2
(45) Date of Patent: *May 15, 2018

(54) MODULAR FURNITURE UNIT HAVING POWER DISTRIBUTION

(71) Applicant: Knoll, Inc., East Greenville, PA (US)

(72) Inventors: Masamichi Udagawa, New York, NY (US); Sigrid Moeslinger, New York, NY (US); Ronald Snyder, Macungie, PA (US)

(73) Assignee: Knoll, Inc., East Greenville, PA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/634,185

(22) Filed: Jun. 27, 2017

(65) Prior Publication Data
US 2017/0290418 A1    Oct. 12, 2017

Related U.S. Application Data

(63) Continuation of application No. 15/152,637, filed on May 12, 2016, now Pat. No. 9,730,513.
(Continued)

(51) Int. Cl.
A47B 7/00 (2006.01)
A47B 21/06 (2006.01)
(Continued)

(52) U.S. Cl.
CPC ............ *A47B 21/06* (2013.01); *A47B 83/001* (2013.01); *A47B 83/02* (2013.01); *A47B 96/02* (2013.01);
(Continued)

(58) Field of Classification Search
CPC ... B25H 1/06; B25H 1/04; B25H 1/12; B25H 1/16; B25H 1/08; A47B 83/001; A47B 21/06; A47B 2200/0016
(Continued)

(56) References Cited

U.S. PATENT DOCUMENTS 460,640 A    10/1891 Huffer et al.
1,280,967 A  10/1918 Crilly
(Continued)

FOREIGN PATENT DOCUMENTS

CA    2829723        4/2014
FR    2962624    *   1/2012
(Continued)

OTHER PUBLICATIONS

International Search Report for PCT/US2016/032253 dated Aug. 31, 2016.
(Continued)

*Primary Examiner* — Janet M Wilkens
(74) *Attorney, Agent, or Firm* — Buchanan Ingersoll & Rooney PC

(57) ABSTRACT

A modular furniture unit can be configured to provide power distribution in conjunction with other furniture features. Embodiments of furniture arrangements may utilize one or more modular furniture units to provide one or more of such features (e.g. storage, seating, privacy, work surface, lighting, etc.). In some embodiments, the modular furniture unit includes an elongated upper member having an upper slot that has a first end and a second end opposite its first end. At least one leg is attached to the first end and at least one leg is attached to the second end. The elongated upper member may have a channel through which power cabling passes and outlets that are connected to such cabling. Different elements can be connected to the upper member via the upper slot or a downward facing opening of the upper member and/or to the legs to provide different furniture arrangements.

18 Claims, 11 Drawing Sheets

Related U.S. Application Data

(60) Provisional application No. 62/169,054, filed on Jun. 1, 2015.

(51) Int. Cl.

| | | |
|---|---|---|
| *A47B 96/02* | (2006.01) | |
| *A47C 7/72* | (2006.01) | |
| *A47C 7/62* | (2006.01) | |
| *A47B 83/02* | (2006.01) | |
| *A47B 83/00* | (2006.01) | |
| *A47B 96/04* | (2006.01) | |
| *H01R 25/00* | (2006.01) | |
| *H01R 24/76* | (2011.01) | |
| *H01R 103/00* | (2006.01) | |

(52) U.S. Cl.
CPC ............... *A47B 96/04* (2013.01); *A47C 7/62* (2013.01); *A47C 7/72* (2013.01); *H01R 24/76* (2013.01); *H01R 25/006* (2013.01); *A47B 2021/066* (2013.01); *A47B 2083/025* (2013.01); *A47B 2200/0081* (2013.01); *H01R 2103/00* (2013.01)

(58) Field of Classification Search
USPC ........... 182/181.1, 129; 108/25, 50.01, 50.02
See application file for complete search history.

(56) References Cited

U.S. PATENT DOCUMENTS

| | | | |
|---|---|---|---|
| 1,727,032 A | 9/1929 | Guignon, Jr. | |
| 1,819,252 A | 8/1931 | Linsner | |
| 2,507,842 A | 5/1950 | Waddill | |
| 2,636,526 A | 4/1953 | Madden | |
| 2,652,079 A | 9/1953 | Worthen | |
| 2,821,450 A | 1/1958 | Knoll | |
| 3,089,599 A | 5/1963 | Casella | |
| 3,241,633 A | 3/1966 | Bond et al. | |
| 3,848,700 A | 11/1974 | Davis, Jr. | |
| 4,325,597 A | 4/1982 | Morrison | |
| 4,375,245 A | 3/1983 | Schill | |
| 4,382,642 A | 5/1983 | Burdick | |
| 4,494,627 A | 1/1985 | Arent | |
| 4,546,889 A | 10/1985 | Schoumaker et al. | |
| 4,567,698 A | 2/1986 | Morrison | |
| 4,711,319 A | 12/1987 | Sansotta et al. | |
| 4,785,911 A | 11/1988 | Kayl | |
| 5,086,597 A | 2/1992 | Kelley et al. | |
| 5,282,519 A | 2/1994 | Venturo et al. | |
| 5,309,686 A | 5/1994 | Underwood et al. | |
| 5,328,260 A | 7/1994 | Beirise | |
| 5,351,785 A | 10/1994 | DuRapau | |
| 5,421,430 A | 6/1995 | Cox | |
| 5,678,380 A | 10/1997 | Azzar | |
| 5,833,332 A * | 11/1998 | Marshall | A47B 21/06 312/223.3 |
| 5,906,420 A | 5/1999 | Rozier, Jr. et al. | |
| 5,943,966 A | 8/1999 | MacHado | |
| 5,971,509 A * | 10/1999 | Deimen | A47B 21/06 108/26 |
| 6,006,863 A | 12/1999 | Legrand et al. | |
| 6,067,762 A | 5/2000 | Greer et al. | |
| 6,123,173 A | 9/2000 | Patros | |
| 6,167,664 B1 | 1/2001 | Reuter et al. | |
| 8,132,371 B2 | 3/2012 | Golinski et al. | |
| 8,347,796 B2 | 1/2013 | Udagawa et al. | |
| 8,371,448 B1 | 2/2013 | Reaux | |
| 8,550,422 B1 | 10/2013 | Thomas | |
| 9,681,763 B2 * | 6/2017 | Udagawa | A47G 5/00 |
| 2003/0066936 A1* | 4/2003 | Beck | H02G 3/288 248/49 |
| 2007/0197082 A1* | 8/2007 | Zeh | A47B 83/001 439/404 |
| 2009/0042428 A1 | 2/2009 | Henriott et al. | |
| 2009/0293402 A1 | 12/2009 | Hamilton et al. | |
| 2011/0233000 A1 | 9/2011 | Sutton et al. | |
| 2011/0297051 A1 | 12/2011 | Martin et al. | |
| 2011/0297052 A1 | 12/2011 | Martin et al. | |
| 2011/0297053 A1 | 12/2011 | Martin et al. | |
| 2012/0085268 A1 | 4/2012 | Straface | |
| 2013/0327256 A1 | 12/2013 | Glenn, II | |
| 2014/0001822 A1 | 1/2014 | Thorson et al. | |

FOREIGN PATENT DOCUMENTS

| | | | |
|---|---|---|---|
| GB | 579885 | * | 8/1946 |
| WO | 2004008911 A1 | | 1/2004 |
| WO | 200952656 A1 | | 4/2009 |

OTHER PUBLICATIONS

Written Opinion of the International Searching Authority for PCT/US2016/032253 dated Aug. 31, 2016.

* cited by examiner

MODULAR FURNITURE UNIT HAVING POWER DISTRIBUTION

CROSS-REFERENCE TO RELATED APPLICATIONS

The present application is a continuation application of U.S. patent application Ser. No. 15/152,637, which claims priority to U.S. Provisional Patent Application No. 62/169,054, filed on Jun. 1, 2015.

FIELD OF INVENTION

The present invention relates to furniture.

BACKGROUND OF THE INVENTION

Furniture can be configured to provide functional units for use in a particular floor layout or office organizational scheme. For instance, cubicle arrangements may be provided for furnishing a room. Office chairs, desks, lighting, and other articles of furniture may also be included in such an arrangement. Examples of furniture systems for use in organizing or decorating interior spaces of buildings such as offices or homes can be appreciated from U.S. Pat. Nos. 8,347,796, 8,132,371, 6,167,664, 6,067,762, 5,943,966, 5,906,420, 5,328,260, 5,309,686, 5,086,597, 4,567,698, 4,546,889, 4,382,642, 4,325,597, and 2,821,450, and U.S. Patent Application Publication No. 2014/018222.

SUMMARY OF THE INVENTION

A modular furniture unit, a furniture arrangement utilizing at least one modular furniture unit, and methods of making and using the same are provided. The modular furniture unit can be configured to provide power distribution in conjunction with other furniture features, such as, for example, storage, seating, privacy, lighting, and/or work surface features. Embodiments of furniture arrangements may utilize one or more modular furniture units to provide one or more of such features (e.g. storage, seating, privacy, work surface, lighting, etc.).

In some embodiments, a modular furniture unit can include an upper member having a first end and a second end, at least one first leg connected to the first end of the upper member, and at least one second leg connected to the second end of the upper member. The upper member can have a top, a bottom, a first sidewall extending from the top to the bottom at a first side of the upper member extending between the first and second ends of the upper member and can also have a second sidewall extending from the top to the bottom at a second side of the upper member that is opposite the first side of the upper member. The second side of the upper member can extend between the first and second ends of the upper member. The upper member can have at least one of: outlets positioned in the first sidewall and outlets positioned in the second sidewall, each of the outlets connected to wiring positioned in the upper member to conduct electricity from a source of electricity to the outlets. The top of the upper member can have an elongated slot extending from adjacent the first end of the upper member to adjacent to the second end of the upper member and the upper member can have a downwardly facing opening defined in the bottom of the upper member.

The modular furniture unit may be connected to different components. For instance, a privacy screen can be attached to the upper member via the slot. As another example, a shelf body may be attached between the at least one first leg and the at least one second leg underneath the upper member and spaced apart from the upper member. As yet another example, a saddle seat can be attached to the upper member via the slot 5. The saddle seat can have a middle portion, a first side portion, and a second side portion. The first side portion can extend downwardly from the middle portion along the first sidewall and the second side portion can extend downwardly from the middle portion along the second sidewall. As yet another example, another type of seat element or a shelf element may be attached to the upper member via the slot. A display device can also (or alternatively) be attached to the upper element via the slot.

In other embodiments, at least one storage device can be attached to the upper member such that the storage device hangs from adjacent the downwardly facing opening. An upper end of the storage device can be attached to the upper member inside the downwardly facing opening. In some embodiments, the storage device may have pouches. In yet other embodiments, at least one privacy screen can be attached to the upper member via the slot and at least one tabletop can be attached to the upper member via the downwardly facing opening.

In some embodiments, the modular furniture unit may include other upper members. For instance, the upper member can be a first upper member and the modular unit can also include a second upper member having a first end and a second end. At least one third leg can be connected to the first end of the second upper member. At least one fourth leg can be connected to the second end of the second upper member. The second upper member can have a top, a bottom, a first sidewall extending from the top to the bottom at a first side of the second upper member extending between the first and second ends of the second upper member, and a second sidewall extending from the top to the bottom at a second side of the second upper member that is opposite the first side of the second upper member. The second side of the second upper member can extend between the first and second ends of the second upper member. The second upper member may have at least one of: outlets positioned in the first sidewall of the second upper member and outlets positioned in the second sidewall of the second upper member, each of the outlets connected to wiring positioned in the second upper member to conduct electricity from a source of electricity to the outlets. The top of the second upper member can have an elongated slot extending from adjacent the first end of the second upper member to adjacent to the second end of the second upper member. There may also be a work surface extending between the first upper member and the second upper member above the first and second upper members. The first upper member can be attached to the work surface adjacent to a first side of the work surface and the second upper member can be attached to the work surface adjacent to a second side of the work surface.

In yet another embodiment, a second upper member can have having a first end, a second end, a top, a bottom, a first sidewall extending from the top to the bottom at a first side of the second upper member extending between the first and second ends of the second upper member, and a second sidewall extending from the top to the bottom at a second side of the second upper member that is opposite the first side of the second upper member where the second side of the second upper member also extends between the first and second ends of the second upper member. The second upper member can have at least one of: outlets positioned in the first sidewall and outlets positioned in the second sidewall, each of the outlets connected to wiring positioned in the second upper member to conduct electricity from a source of electricity to the outlets. The top of the second upper member can have an elongated slot extending from adjacent the first end of the second upper member to adjacent to the second end of the second upper member and the second upper member can also have a downwardly facing opening defined in the bottom of the second upper member. The second end of the first upper member can be adjacent to the first end of the second upper member and an upper member inter-connection connector can be attached between the first end of the second upper member and the second end of the first upper member within the downwardly facing openings of the first and second upper members. The at least one second leg that is attached to the second end of the first upper member can be attached to the second end of the first upper member via the upper member inter-connection connector and at least one second leg can also be attached to the first end of the second upper member via the upper member inter-connection connector. At least one third leg can be attached to the second end of the second upper member.

A furniture arrangement is also provided. The arrangement can include a first modular unit and a second modular unit. The first modular unit can include: a first upper member having a first end and a second end, at least one first leg connected to the first end of the first upper member, and at least one second leg connected to the second end of the first upper member. The first upper member can have a top, a bottom, a first sidewall extending from the top to the bottom at a first side of the first upper member extending between the first and second ends of the first upper member. The first upper member can also have a second sidewall extending from the top to the bottom at a second side of the first upper member that is opposite the first side of the first upper member. The second side of the first upper member can also extend between the first and second ends of the first upper member. The first upper member can have at least one of: outlets positioned in the first sidewall and outlets positioned in the second sidewall. Each of the outlets can be connected to wiring positioned in the upper member to conduct electricity from a source of electricity to the outlets. The top of the first upper member can define an elongated slot extending from adjacent the first end of the upper member to adjacent to the second end of the first upper member and the first upper member can also define a downwardly facing opening in the bottom of the upper member. A second modular unit may be connectable to the first modular unit.

In some embodiments, the second modular unit can include a second upper member having a first end, a second end, a top, a bottom, a first sidewall extending from the top to the bottom at a first side of the second upper member extending between the first and second ends of the second upper member, and a second sidewall extending from the top to the bottom at a second side of the second upper member that is opposite the first side of the second upper member where the second side of the second upper member also extends between the first and second ends of the second upper member. The second upper member can have at least one of: outlets positioned in the first sidewall and outlets positioned in the second sidewall. Each of the outlets of the second upper member can be connected to wiring positioned in the second upper member to conduct electricity from a source of electricity to the outlets. The top of the second upper member can have an elongated slot extending from adjacent the first end of the second upper member to adjacent to the second end of the second upper member. The second upper member can also have a downwardly facing opening defined in the bottom of the second upper member.

In some embodiments of the arrangement, the second end of the first upper member can be adjacent to the first end of the second upper member. The upper member inter-connection connector can be attached between the first end of the second upper member and the second end of the first upper member within the downwardly facing openings of the first and second upper members. The at least one second leg attached to the second end of the first upper member can be attached to the second end of the first upper member via the upper member inter-connection connector and the at least one second leg can also attached to the first end of the second upper member via the upper member inter-connection connector. At least one third leg may be attached to the second end of the second upper member. The legs may facilitate supporting the first and second upper members on a floor.

In some embodiments, work surface may be attached between the first upper member of the first modular unit and the second upper member of the second modular unit. For instance, the work surface may be a tabletop, countertop, or desktop. In other embodiments, a privacy screen can be attached to the first modular unit and a privacy screen can also be attached to the second modular unit. In yet other embodiments, a display device can be connected to the first modular unit. In some embodiments, the first and second upper members may be connected adjacent to each other to define a generally "L" shaped, a generally "V" shaped, generally "T" shaped, or a generally "I" shaped arrangement.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of modular furniture units, exemplary embodiments of furniture arrangements utilizing such units are shown in the accompanying drawings and certain exemplary methods of making and practicing the same are also illustrated therein. It should be appreciated that like reference numbers used in the drawings may identify like components. For instance, it should be understood that the embodiments illustrated in FIGS. 2-11 each utilize the exemplary embodiment of the modular furniture unit shown in FIG. 1 in addition to at least one other element connected to that unit and/or the inclusion of additional embodiments of the first exemplary embodiment of the modular furniture unit shown in FIG. 1.

DETAILED DESCRIPTION OF EXEMPLARY EMBODIMENTS

Figure 1:
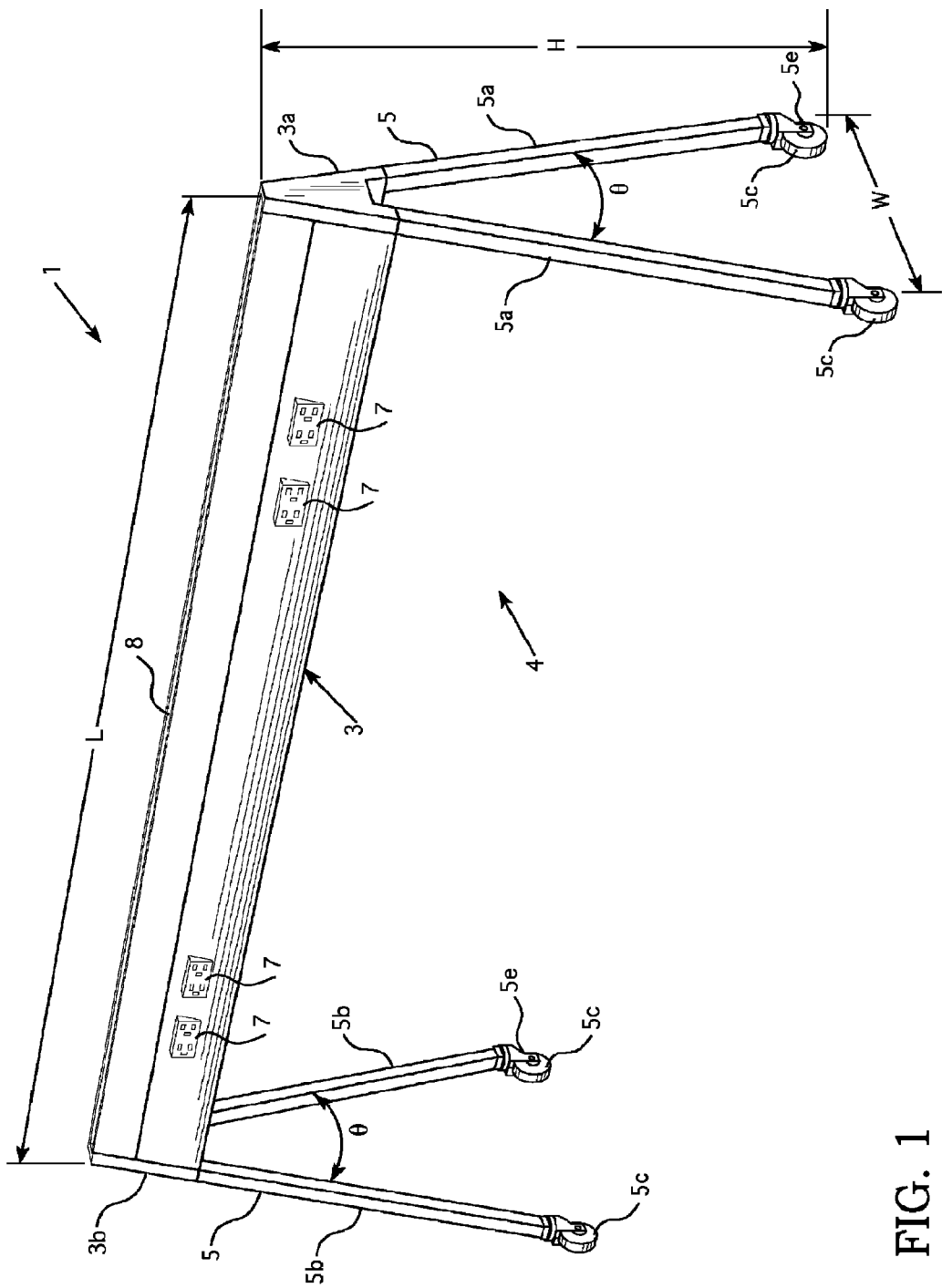
FIG. 1 is a perspective view of a first exemplary embodiment of a modular furniture unit.

Referring to FIGS. 1-13, a modular furniture unit 1 can include an upper elongated member 3 that is supported by a base 4 that has a plurality of legs 5 that extend downwardly from the upper member 3 to support the upper member 3 on a floor. The upper member 3 can extend along its length from a first end 3a to its second end 3b. The upper member 3 can also include a plurality of outlets 7 positioned on sidewalls of the upper member 3. The sidewalls may extend from a top of the upper member to a bottom of the upper member at opposite sides of the upper member.

The height H of the modular furniture unit 1 can be perpendicular to the length L of the upper member 3. The height H may extend vertically from the top of the modular furniture unit 1 to its bottom. The length of the modular furniture unit may be at least primarily defined by the length L of the upper member 3. The width W of the modular furniture unit 1 can be perpendicular to its length and height H. In some embodiments, the width W could also be considered a depth, diameter, or thickness.

The upper member 3 can have at least one channel or other conduit defined therein that contains wiring connected to the outlets for supplying electricity to the outlets. A plug may be extendable or connectable to the upper member for connecting that wiring to a source of electricity for distributing electricity to the outlets. The source of electricity to which the modular furniture unit 1 and its outlets 7 are connectable may be an outlet on a floor or a wall adjacent to where the modular furniture unit is positioned.

The legs 5 of the base 4 can include a first set of legs, which may include a first pair of first legs 5a, and a second set of legs, which may include a second pair of second legs 5b. The first legs 5a can extend downwardly from adjacent a first end 3a of the upper member 3 and the second legs 5b can extend downwardly from adjacent a second end 3b of the upper member 3. The terminal bottom end of each of the legs 5 may be configured to contact the floor or may be attached to a floor contacting element 5c. In some embodiments, the floor contacting element 5c may be a castor 5e or may be glide 5d.

The castors 5e can allow the modular furniture unit 1 to be rolled on the floor when moving the modular furniture unit to different positions on a floor. The glides 5d may be configured to permit the modular furniture unit to be slid along the floor. Of course, whether glides 5d, castors 5e, or other floor contacting element 5c is utilized, the modular furniture unit 1 may also be sized and configured so that a user can pick up the modular furniture unit 1 to lift that unit up off the ground to carry the unit when moving the unit to a new location.

The first set of first legs 5a may include a pair of first legs 5a that extend downwardly from the upper member 3 at an angle θ relative to each other and the second set of second legs 5b may also include a pair of legs 5b that extend downwardly from the upper member 3 at an angle θ relative to each other. In some embodiments, the angle θ can be set so that the legs extend from the upper member 3 so that the upper member 3 and the legs provide an appearance of a "saw horse" type structure. For instance, in some embodiments the angle θ can be between 10° and 65°, between 20° and 60°, between 25° and 50°, between 30° and 45° or between 30° and 40°. For embodiments utilizing multiple upper members 3, which may have more than two sets of legs, each set of legs may include a pair of legs that extend downwardly from the upper member at an angle of θ relative to each other.

The upper member 3 can also include an upper slot 8. The upper slot 8 may be defined in the top of the upper member 3. The slot 8 may be defined to include a profile for facilitating the interconnection of different elements in the upper slot 8. There may also be holes defined in the upper member adjacent to the slot for receiving screws, bolts, or other fasteners for facilitating a connection of different elements to the top of the upper member via the slot 8. For instance, as can be appreciated from FIGS. 3, 5, 6, 7, 8, 9, 10, and 11, at least one element may be connected to the upper member 3 via the slot.

Figure 3:
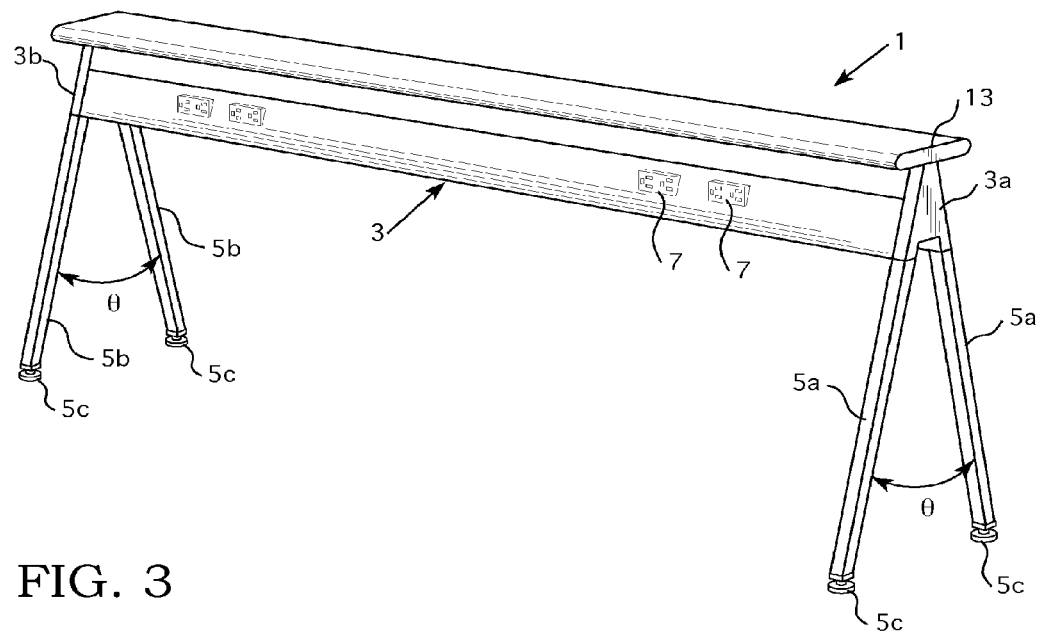
FIG. 3 is perspective view of a third exemplary embodiment of a modular furniture unit.
Figure 4:
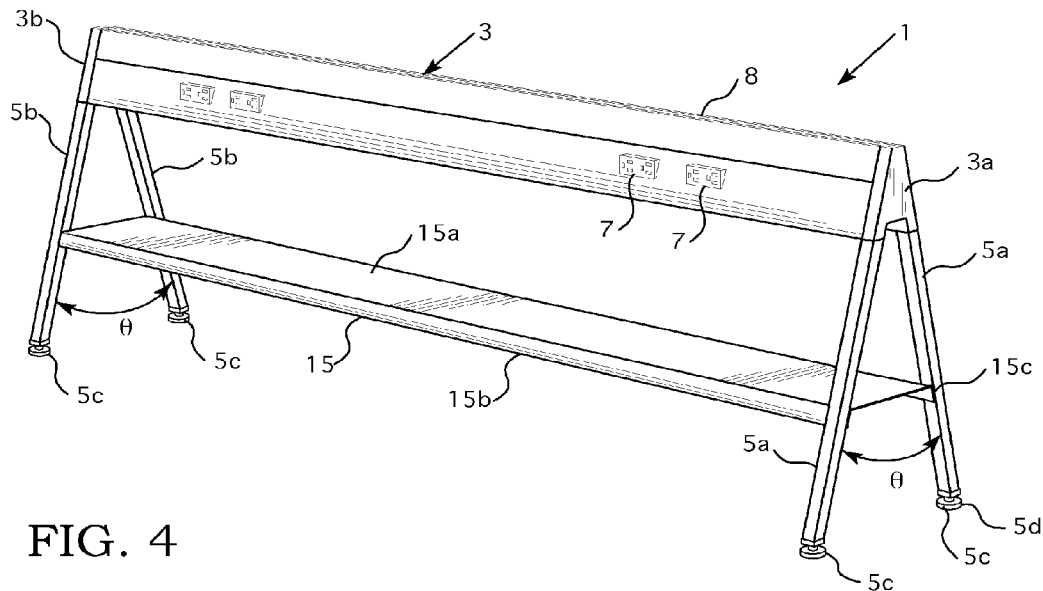
FIG. 4 is a perspective view of a fourth exemplary embodiment of a modular furniture unit.
Figure 5:
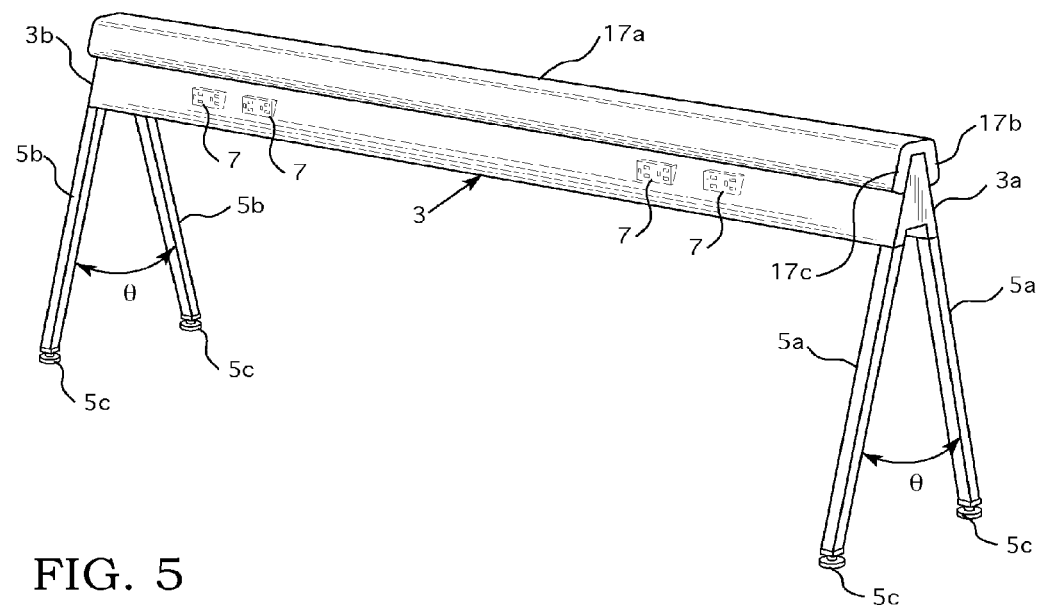
FIG. 5 is a perspective view of a fifth exemplary embodiment of a modular furniture unit.

For instance, to provide a ledge for storage of an item or to provide a seat for a user, a rigid elongated polygonal shelf or seat element 13 may be attached to the upper member 3 via the slot 8 as shown in FIG. 3. The elongated polygonal shelf or seat element 13 may be composed of metal, a polymeric material, wood, a composite or other material and be structure in width, height, and length to facilitate the support of a portion of a user's body or the support of equipment or other materials a user may want to rest on the shelf or seat element 13, such as books, a laptop computer, an electronic tablet, or other type of work material.

As another example, a saddle seat 17 can be attached to the top of the upper member 3 via the upper slot 8. The saddle seat 17 can be configured to have a middle portion 17a that extends along the length L of the upper member 3 along its top and have first and second side portions 17b and 17c that extend downwardly form the middle portion 17a of the saddle seat 17 along upper portions of the sidewalls of the upper member 3 that have the outlets 7. The saddle seat 17 can be configured so that a portion of a user's back or buttocks can be in contact with the saddle seat to support a leaning or seated user. The saddle seat 17 can also be configured to facilitate a user straddling the upper member so that one leg of the user extends down from the middle portion 17a of the saddle seat adjacent the first side 17b of the saddle seat and the other leg of the user extends from the middle portion 17a to adjacent the second side 17c of the saddle seat 17 as the legs of the user sitting on the saddle seat 17 straddle the saddle seat 17 and extend from the saddle seat 17 to the floor.

Figure 6:
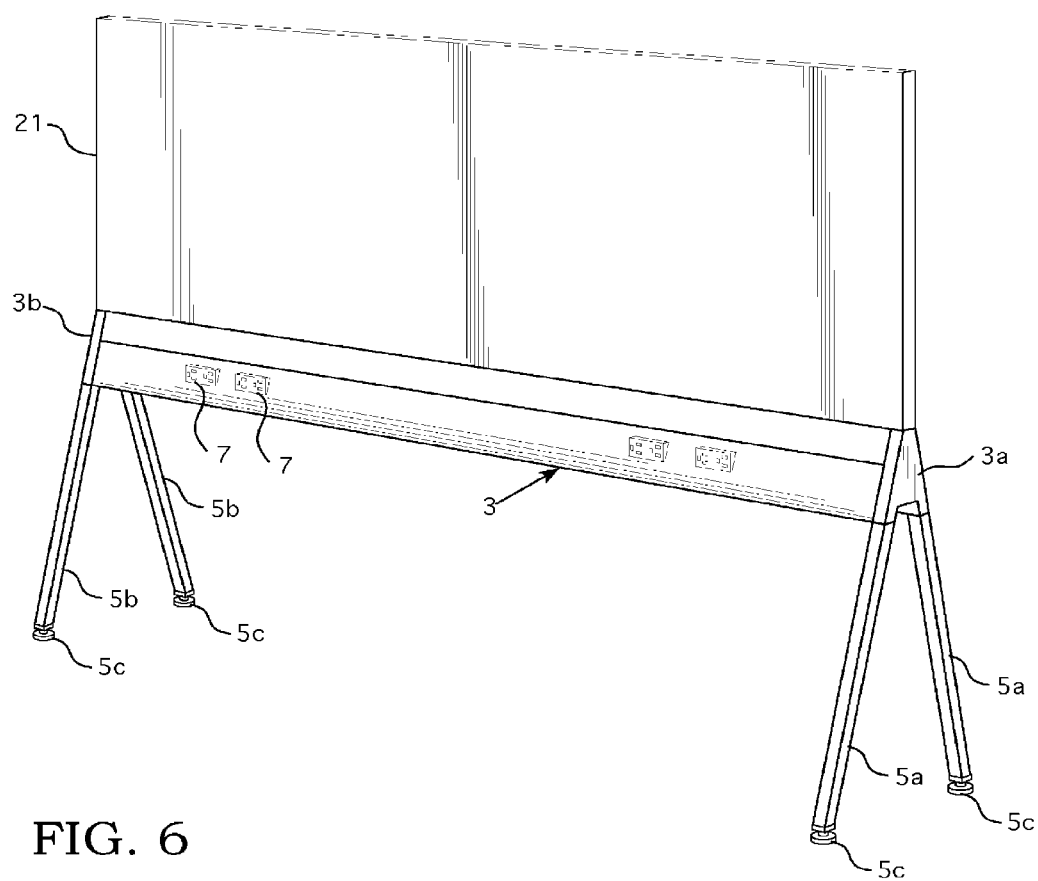
FIG. 6 is a perspective view of a sixth exemplary embodiment of a modular furniture unit.
Figure 7:
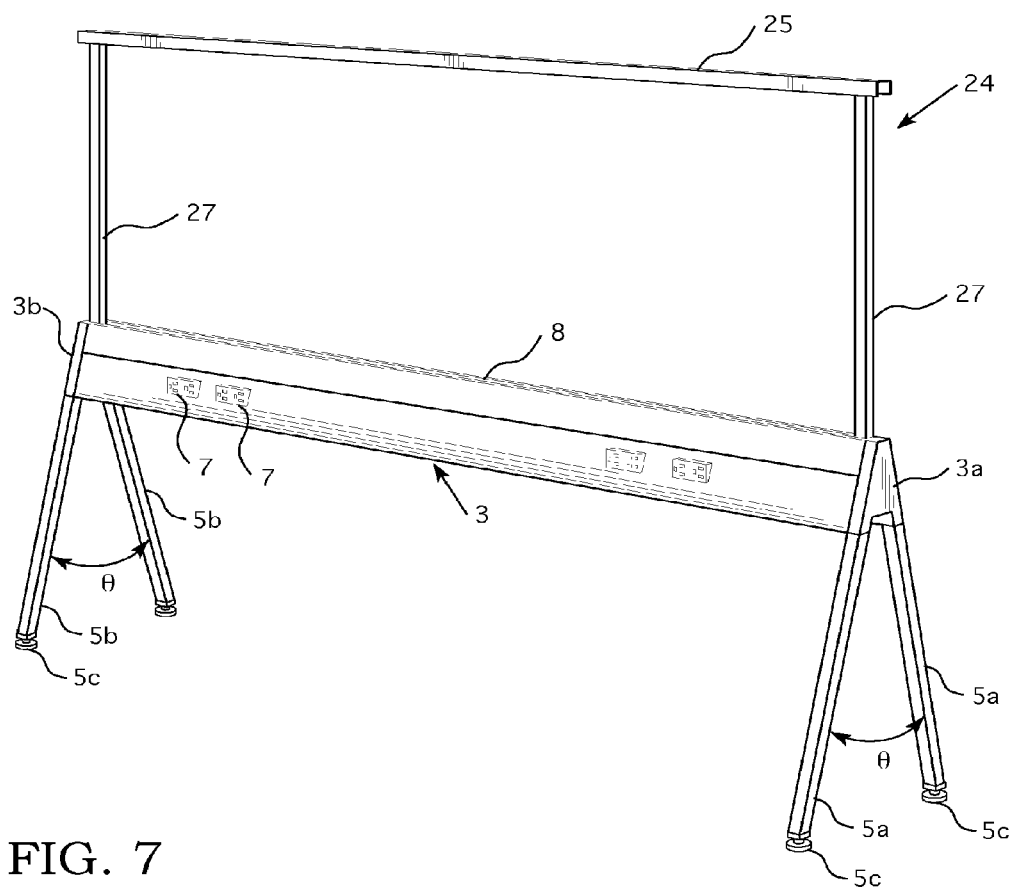
FIG. 7 is a perspective view of a seventh exemplary embodiment of a modular furniture unit.
Figure 10:
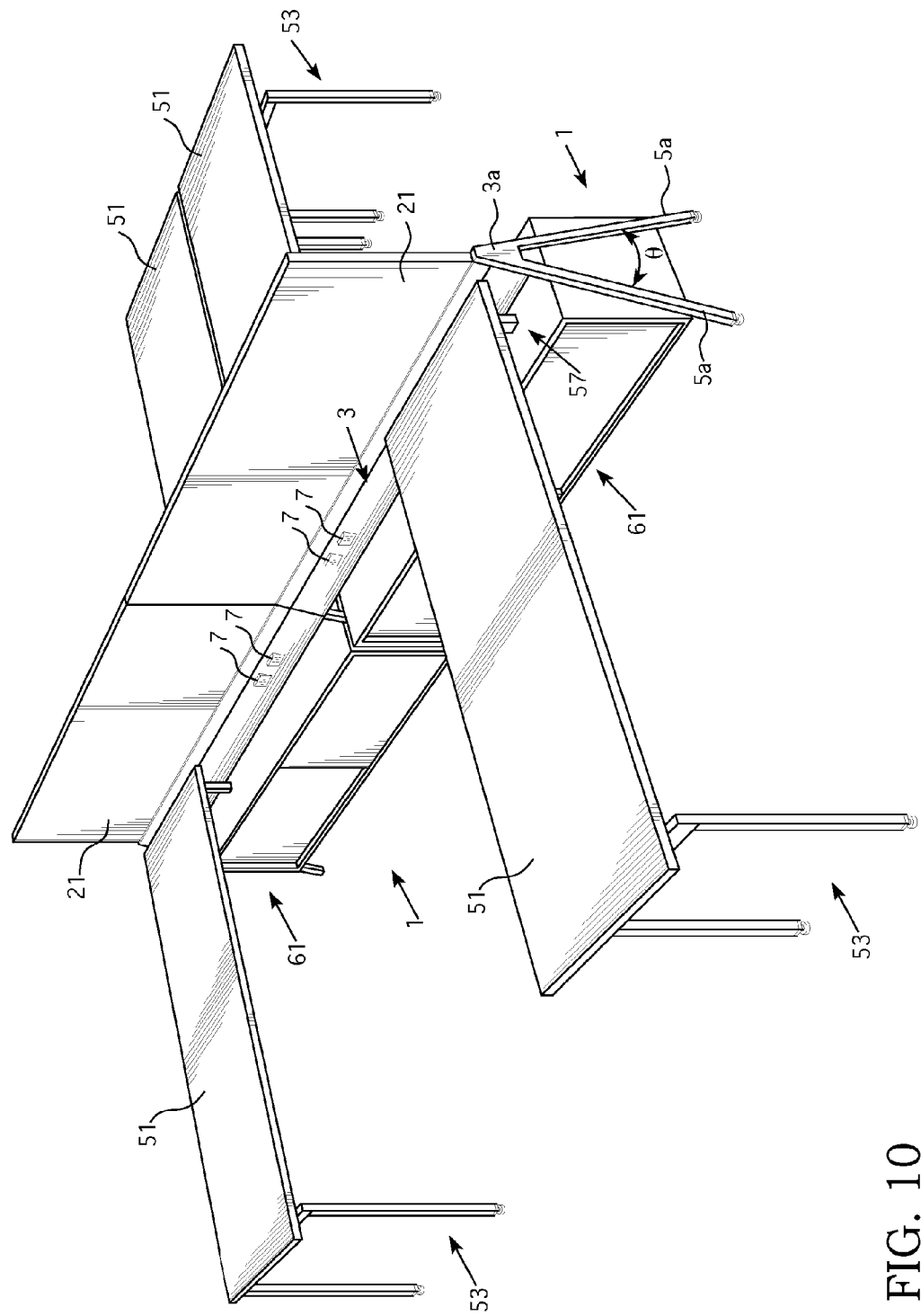
FIG. 10 is a perspective view of a second exemplary embodiment a furniture arrangement utilizing embodiments of the first exemplary embodiment of the modular furniture unit.
Figure 11:
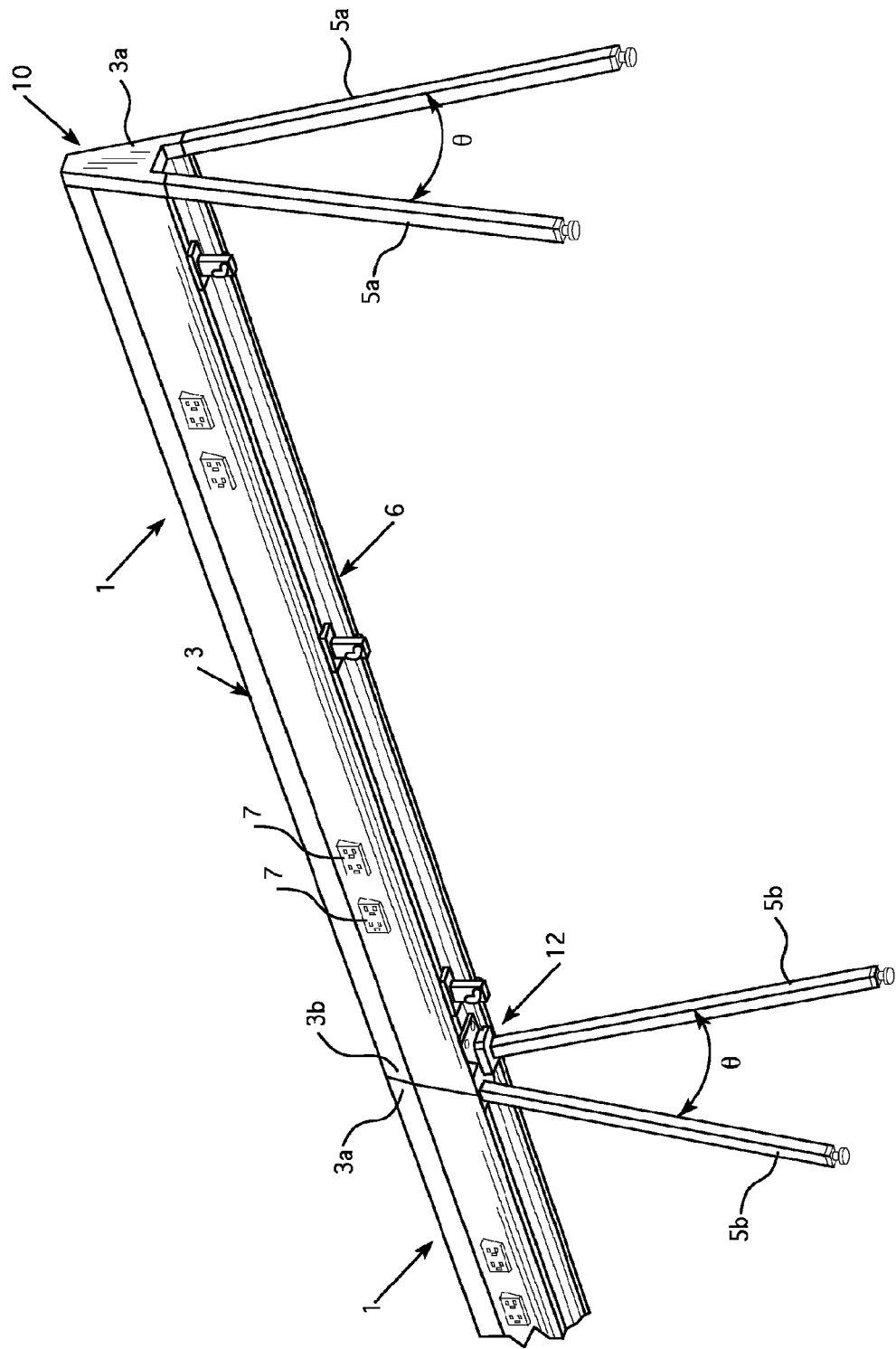
FIG. 11 is a fragmentary view of the second exemplary embodiment a furniture arrangement illustrating an interconnection mechanism that can be used for connecting different modular furniture units.
Figure 12:
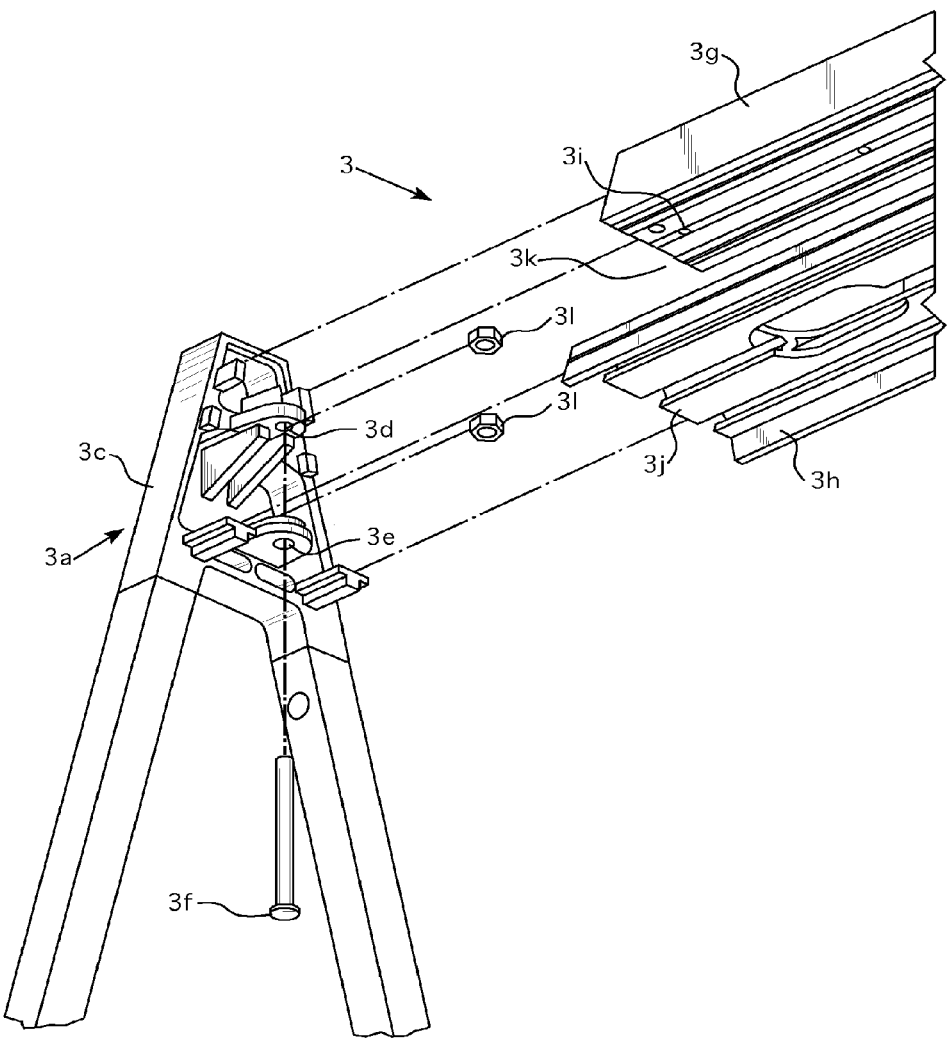
FIG. 12 is a fragmentary exploded view illustrating an exemplary arrangement of the upper member 3 of the modular furniture unit.

As yet another example, FIGS. 6 and 10 illustrate privacy screen walls 21 that are connected to the top of the upper member 3 via the upper slot 8. The privacy screen walls 21 may be a wall structure that has upwardly projecting sides to define a vertically extending privacy screen body having a polygonal shape (e.g. rectangular, hexagonal, etc.) or a circular or oval shape that extends upwardly from the upper member 3 to provide a visibility barrier to improve the privacy of a work area that may be at least partially defined by the furniture unit 1.

As yet another example, a lighting device 24 can be connected to the top of the upper member 3 via the upper slot 8. Posts 27 may be attached to the top of the upper member 3 via the slot adjacent to the opposite first and second ends 3a and 3b of the upper member. A horizontal light supporting element 25 may be connected between the top ends of the posts 27. The horizontal light supporting element 25 may include lights attached to a bottom surface or positioned to direct light downwardly from the light supporting element 25. Electricity to power the lighting may be connected to the lights via a wired plug connection to an outlet 7 or via another type of connection to the electricity conducting wiring within the upper member 3.

As yet another example, shelving or cabinets or other type of equipment storage device or other type of storage device may be attached above the top of the upper member 3 or otherwise positioned on or above the upper member 3. For instance, shelving, cabinets, or both cabinets and shelving may be attached to the upper member via one or more connectors that are positioned in the slot 8 for attachment of the cabinets and/or shelving to the upper member 3.

Figure 8:
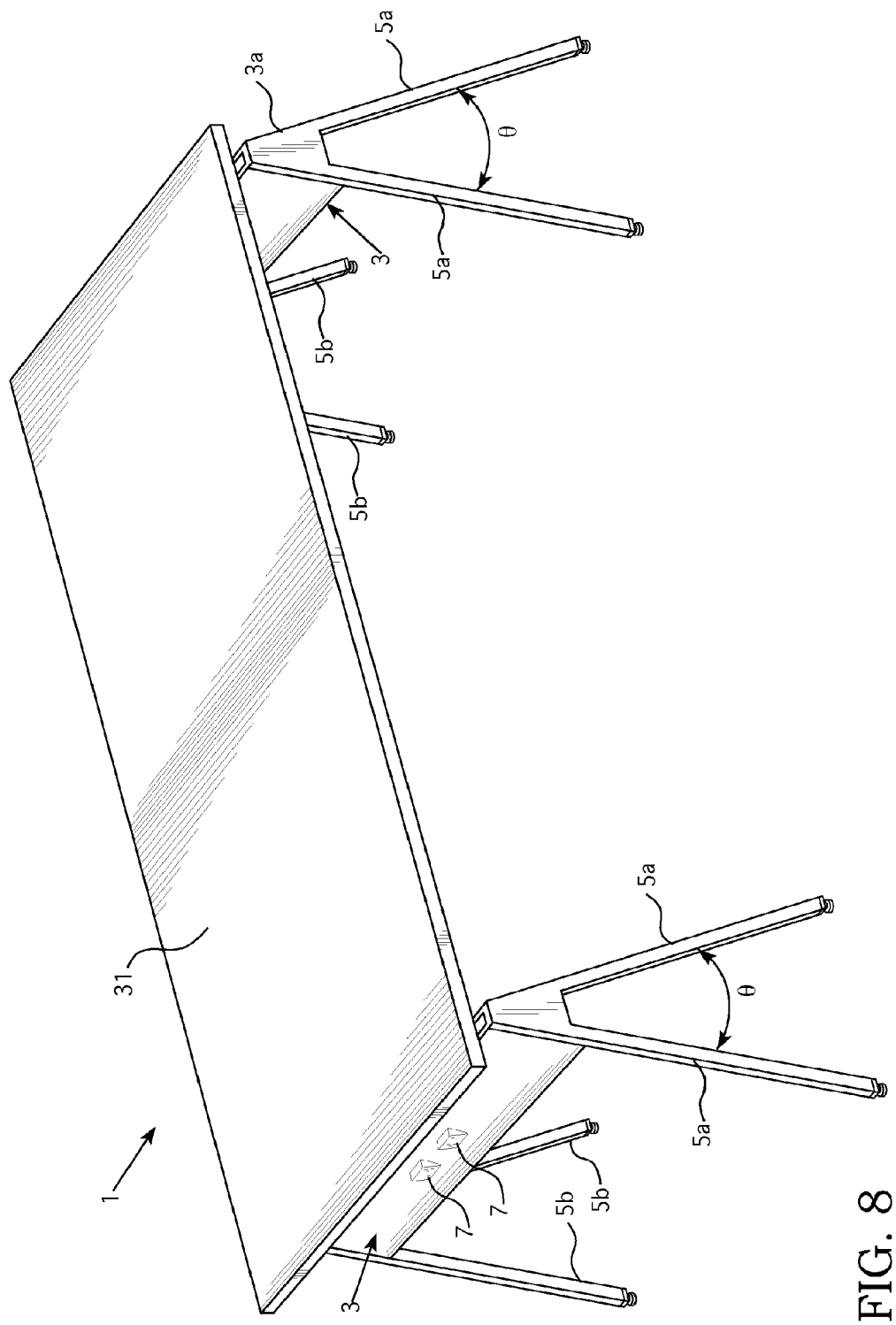
FIG. 8 is a perspective view of a first exemplary embodiment of a furniture arrangement utilizing embodiments of the first exemplary embodiment of the modular furniture unit.
Figure 9:
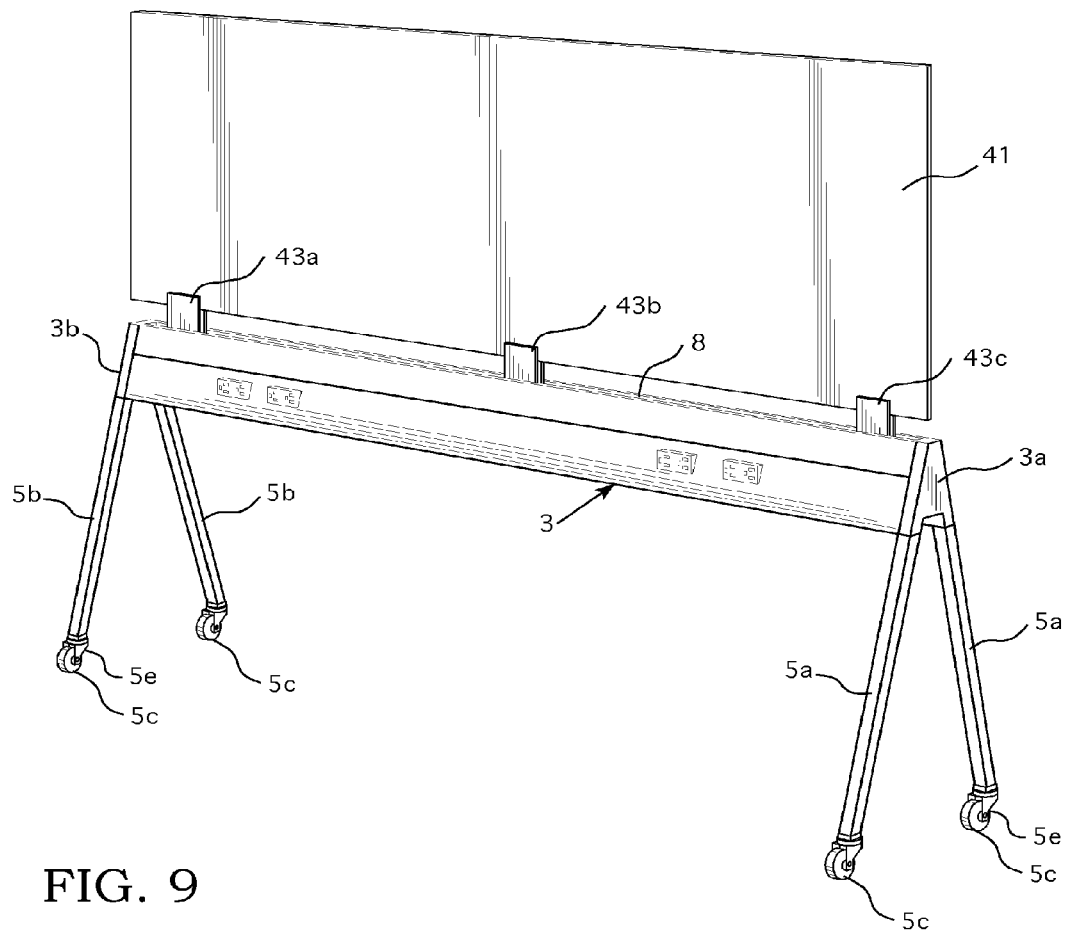
FIG. 9 is a perspective view of an eighth exemplary embodiment of a modular furniture unit.

As yet another example, referring to FIG. 8, a tabletop, desktop or other type of work surface 31 can be attached to multiple different upper members 3 of different spaced apart modular furniture units 1 via the upper slots 8 of those units so that the work surface is supported above the modular furniture units 1 to which it is attached. In some embodiments, the work surface 31 may be a polygonal, circular, or elliptical shaped structure that defines an upper work surface 31 that is flat, substantially flat (e.g. within 1°-2° of being flat or within 5° of being flat), inclined, or declined work surface that may support equipment, papers, books, lighting, tools, or other equipment and/or things. The work surface may have its underside attached to the top of a first modular unit 1 via the upper slot 8 of that unit 1 adjacent a first end or first side of that work surface. The work surface 31 may have its underside attached to the top of a second modular unit 1 via the upper slot 8 of that unit adjacent to a second end or second side of that work surface 31 that is opposite its first end or first side. In some embodiments, the work surface may have downwardly extending connectors attached to its underside for positioning in the slots 8 of the modular furniture units or may be connected to fasteners or other fastening mechanism that is connected to the upper member 3 within the slot 8 and extends upwardly from the slot 8 for attachment to the underside of the work surface 31. In other embodiments, it is contemplated that connectors may extend from the upper slots 8 of the upper members 3 for attachment of upper members of spaced apart modular furniture units at opposite edges of the work surface for attaching the work surface to the upper member 3 and supporting the work surface 31 above that upper member 3.

As yet another example, a display device 41 such as a television, liquid crystal display, computer monitor, or other type of display device may be connected to the upper member via the upper slot 8. First, second, and third connectors 43a, 43b, and 43c may be connected to the upper member and extend from the upper slot 8 and be connected between the upper member 3 and display device 41 to connect the display device 41 to the upper member 3 and support the display device 41 above the upper member 3. For instance, first connector 43a may be positioned to extend from the slot 8 adjacent to the second end 3b of the upper member, third connector 43c may be positioned to extend from the slot adjacent to the first end 3a of the upper member 3 and the second connector 43b may be positioned to extend from the slot 8 between the first and third connectors 43a and 43c in the slot 8 (e.g. in a central portion of the slot 8 or in a middle portion of the slot 8). Each connector may include fasteners, a mating profile, and/or other type of fastening mechanism that fasten the connectors to the upper member 3 within the slot 8 and also include fasteners and/or a mating profile and/or other type of fastening mechanism for connection to the display device 41.

The display device 41 may also be plugged into an outlet 7 for receiving electricity to power the display device via the outlet 7 and wiring passing through the upper member 3. Alternatively, it is contemplated that the display device 41 may be coupled to electrical wiring passing through the upper member in the slot 8 or adjacent the slot 8. A user may then turn on or off the display device and/or connect other equipment to the display device 41 for use of the display device 41, which is powered via the electricity provided via the wiring passing through the upper member 3.

Figure 2:
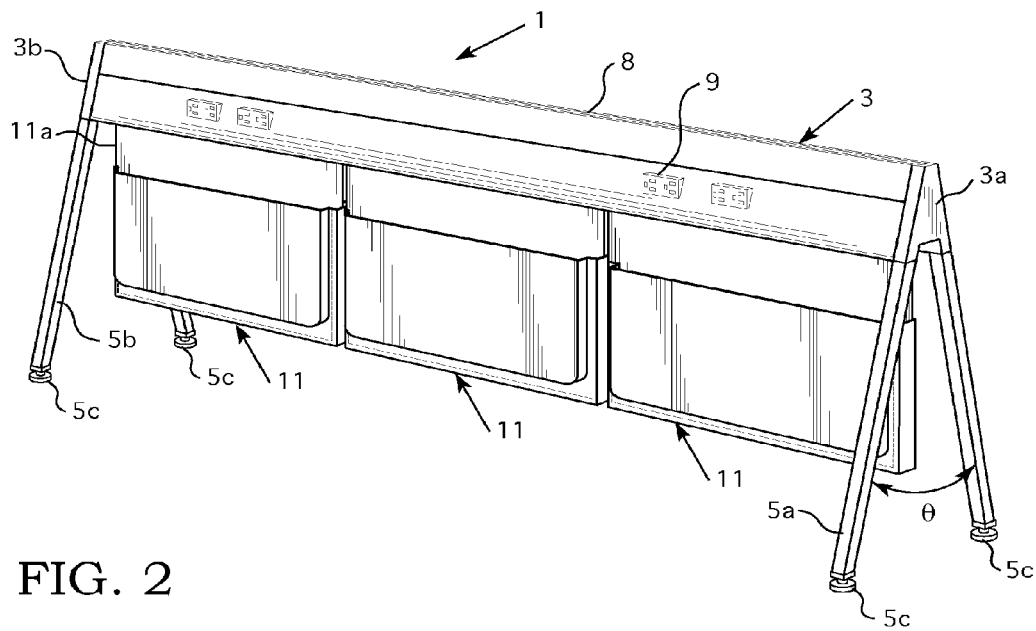
FIG. 2 is a perspective view of a second exemplary embodiment of a modular furniture unit.

The upper member 3 can also include a downwardly facing opening 6 defined in the bottom of the upper member 3. The opening 6 can be configured to facilitate connection to other elements, such as, for example, hanging storage devices 11 as shown in FIG. 2. Each hanging storage device 11 may define one or more pockets or other type of storage element 11a (e.g. a shelf or a pouch, etc.) and be configured so that an upper end of each hanging storage device 11 is attached to the bottom portion of the upper member within the opening 6. Connectors may be positioned in the opening 6 for releasably fastening the storage devices 11 to the upper member via the downwardly facing opening 6. The storage devices 11 may hang from the upper member such that a bottom portion of each storage device 11 is above a floor on which the modular furniture unit is supported via the base 4 (e.g. legs 5 alone or in connection with floor contacting elements 5c, etc.). For instance, each storage device 11 may be suspended from the upper member 3 such that the storage device 11 hangs from the upper member and the bottom edge of the storage device 11 is spaced apart from the floor.

Other embodiments may be configured so that shelving, cabinets, or other types of storage devices are attachable to the upper member 3 such that they are hung from the upper member 3. For instance, shelving or cabinets may be suspended from the upper member 3 via connection to the upper member inside of opening 6 or may be hung from another portion of the upper member 3.

The upper member 3 can have the upper slot 8 and bottom opening 6 defined therein to facilitation interconnection to internal members that extend between the first and second ends 3a and 3b of a modular unit. In some embodiments, the upper member 3 can be arranged to include rigid elongated members at certain location within the upper member 3 to help provide rigidity to the upper member 3. For example, referring to FIG. 12, the upper member 3 may have an arrangement 3c at the first end 3a. The arrangement 3c can also be located at the second end 3b. The arrangement 3c can be configured to facilitate formation of the upper member 3 via connections to a top beam 3g and a lower beam 3h that are spaced apart from each other and extend between the first and second ends 3a and 3b. The arrangement may include a bracket assembly that has an upper protrusion having a hole 3d and a lower protrusion having a hole 3e. The upper protrusion can be configured to facilitate the holding and/or supporting of a terminal end of the top beam 3g by having the terminal end of that beam located on top of the protrusion. The lower protrusion can be configured to facilitate the holding and/or supporting of a terminal end of the bottom beam 3h by having the terminal end of that beam located on top of the protrusion. An elongated fastener element 3f can extend through the hole of the lower protrusion 3e, a hole 3j defined in the bottom beam 3h, the hole 3d of the upper protrusion and a hole 3i defined in the top beam 3g. Nuts 31 or other mechanism may be positioned to help facilitate a connection of the fastener element 3f to the upper and lower protrusions. For instance, an upper nut 31 may be attached adjacent a top end of the fastener element above the upper protrusion and a lower nut 31 may be attached to an intermediate location of the fastener element above the lower protrusion and below the upper protrusion for attaching the fastener element to the upper and lower protrusions and the top and bottom beams 3g and 3h. The upper nut 31 may also be located on or inside of top beam 3g and the lower nut 31 may be located on or inside the bottom beam 3h. The elongated fastener element 3f can be a bolt, a screw or other type of fastener. The fastener elements 3f located at the opposite first and second ends 3a and 3b via arrangement 3c can be made of metal and be configured to be rigid to add rigidity to the structure formed by the interconnected top and bottom beams at the first and second ends 3a and 3b. Sidewalls of the upper member can be subsequently attached between the first and second ends to cover the sides of the gap 3k defined between the top and bottom beams 3g and 3h. The sidewalls can be elongated to help define the bottom opening 6 and/or the bottom beam 3h may be structured to define that bottom opening 6.

Figure 13:
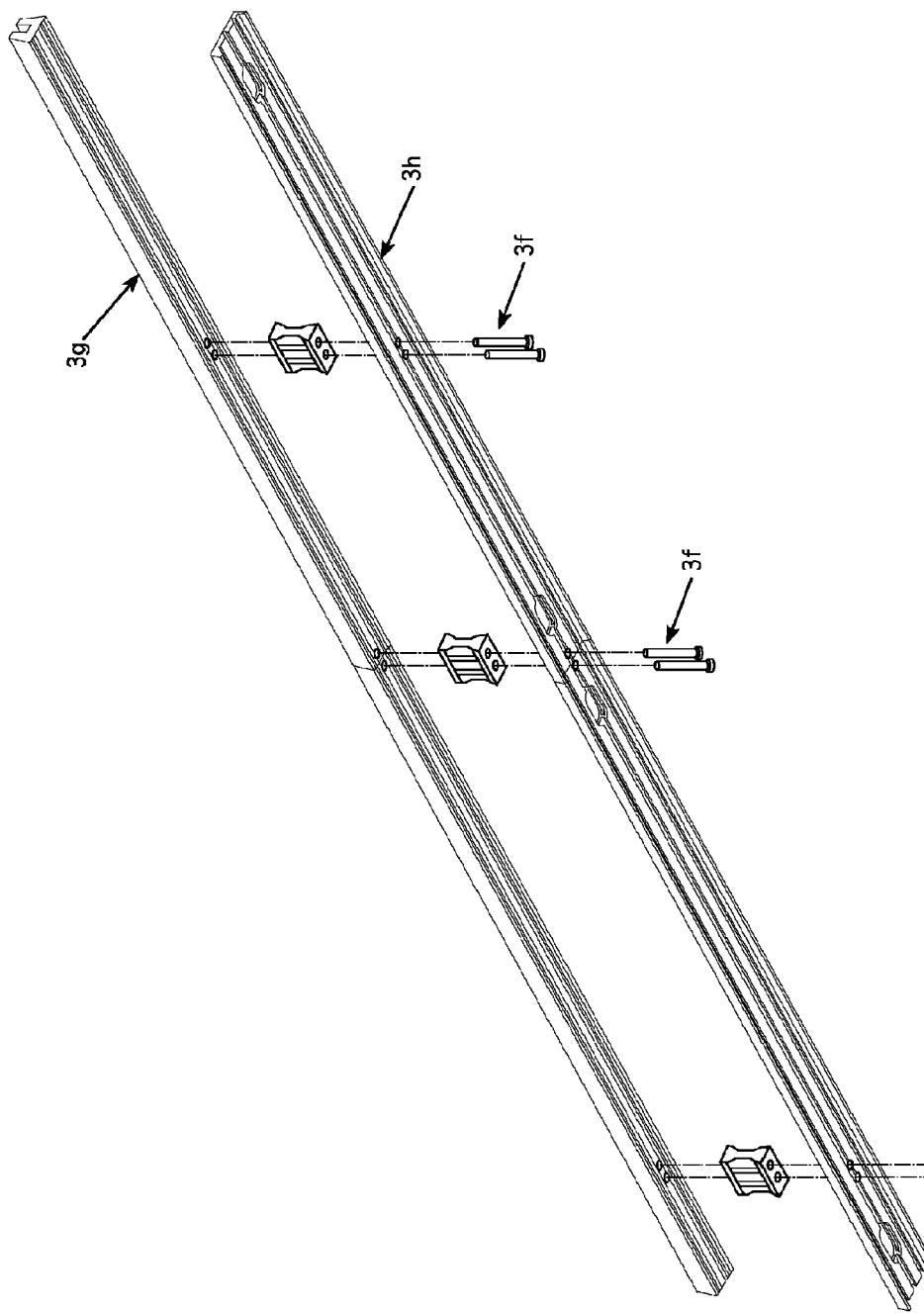
FIG. 13 is a fragmentary exploded view illustrating an exemplary arrangement of the upper member 3 of the modular furniture unit.

As shown in FIG. 13, fasteners 3f can also be positioned at intermediate locations between the terminal ends of the top and bottom beams 3g and 3h. At these locations, the arrangement 3c may not be used. Casings, castings, spacers, pillars, and/or housings may be located in the gap 3k between the beams to facilitate receipt of those fasteners and to help improve the rigidity of the upper member formed by the interconnection of the beams. Additionally, such a configuration in which a casing, pillar, spacer, casting, and/or housing is used in conjunction with one or more fasteners 3f can be placed in the gap 3k between different ends of the top and bottom beams 3g and 3h of two different modular units for interconnecting those units to extend or define the shape of an arrangement of modular units. For such an interconnection, the arrangement 3c may not be needed. Instead, use of a casing, casting, pillar, spacer, and/or housing with fasteners 3f can be used. An inter-connection connector 12 can also be utilized in conjunction with the fasteners 3f and the casing, housing, casting, pillar, and/or spacer at such a location. The fasteners 3f may extend from those inter-connection connectors 12 through the bottom beam 3h and through and/or to the top beam 3g for interconnecting the bottom beam 3h, top beam 3g, and inter-connection connector 12 to the adjacent terminal ends of the bottom beams and top beams for the inter-connected upper members of the units at the inter-connection location.

Embodiments of the modular furniture unit 1 can also be configured so that at least one shelf or other type of storage element is connectable between the legs 5 of the unit 1. For instance, a first end of an elongated shelf body 15 can be connected to the first legs 5a and the second end of the elongated shelf body 15 can be attached to the second legs 5b so that the shelf body extends along the substantial length L (e.g. within 5% of this length L, equal to this length L, etc.) of the upper member below and spaced apart from the upper member 3. In some embodiments, the first end of the shelf body 15 can be shaped to match the profile defined by the spaced apart first pair of first legs 5a to have an interference fit within the spaced defined by those legs for connecting the first end of the shelf body to the first legs 5a. The second end of the shelf body 15 can also be shaped to match the profile defined by the spaced apart second pair of second legs 5b to have an interference fit within the spaced defined by those legs for connecting the second end of the shelf body to the second legs 5b. For instance, the shelf body 15 can include a middle portion 15a that is between a first side portion 15b and a second side portion 15c. Each of the side portions may extend downwardly from the middle portion 15a at an angle relative to the middle portion 15a (e.g. an angle of declination or inclination) for matching the profile of the angled apart pair of legs at each end of the upper member 3. In other embodiments, the ends of the shelf body 15 may be attached to the legs via at least one type of attachment mechanism such as brackets, welding, adhesives, and fasteners. The upper surface of the middle portion 15a of the shelf body 15 may be flat or substantially flat (e.g. within 2°-3° of being flat) to support books, computer related equipment, electronic tablets, bags, purses, shoes, or other tools or equipment a user may place on the shelf body 15. If those tools or equipment are electrically powered, they may be plugged into an outlet 7 for use or charging while positioned on the middle portion 15a of the shelf body 15.

The modular furniture unit 1 can also be configured so that multiple upper members are interconnected and supported by multiple legs connected to those upper members 3. For instance, examples of such interconnection of multiple upper members 3 can be appreciated from FIGS. 10 and 11. A first upper member 3 may have its second end 3b abut a first end 3a of a second upper member 3. If not abutting, the first end 3a of the second upper member 3 may be positioned very close to the second end 3b of the first upper member (e.g. within 0.5 centimeters, within 1 centimeter, within 2-3 centimeters).

The first and second upper members may be interconnected by legs that are attached to the first and second upper members via an upper member inter-connection connector 12. The upper members may also be interconnected via interlockable profiles and/or other interconnection features in addition to the upper member inter-connection connectors 12. A distal first end 3a of the first upper member 3 may be attached to a leg connector 10 that is configured to be attached at the end of the upper member for connecting the first legs 5a to the first end 3a of the first upper member 3. The second end of the second upper member 3 may also be connected to such a leg connector 10 for connection of third legs to that second upper member 3. Alternatively, the second end of the second upper member 3 may be connected to another upper member inter-connection connector 12 if that second end of the second upper member is to be connected to a first end of a third upper member 3. The number of interconnected upper members 3 interconnected via upper member inter-connection connectors 12 may be more than two or three or may be only two or only three for different embodiments. In some embodiments, terminal ends of the upper element formed from multiple interconnected upper members 3 of multiple modular furniture units 1 being connected together may be configured to have the leg connectors 10 attached thereto, while the ends of interconnected upper members may be connected via the upper member inter-connection connectors 12.

Each upper member inter-connection connector 12 can be positioned in the downwardly facing opening 6 at the bottom of the upper members between the upper members being interconnected. For instance, the upper member inter-connection connector 12 connecting the first and second upper members 3 shown in FIG. 1 can be positioned at the interface between the first end 3a of the second upper member 3 and the second end 3b of the first upper member 3. Second legs 5 may be attached to the upper member inter-connection connector 12 to extend downwardly from the bottom of the upper member to adjacent a floor at an angle θ relative to each other. Fasteners or other type of fastening mechanism may be utilized for attachment of the upper member inter-connection connector 12 to the upper members 3 adjacent the first end 3a of the second upper member 3 and the second end 3b of the first upper member 3. The legs may be attached to the upper member inter-connection connector 12 via mateable interconnection mechanism, fasteners, or other type of fastening mechanism.

Each inter-connection connector 12 can also be configured to incorporate at least one elongated fastener element 3f to extend through holes in the top and bottom beams 3g and 3h and in a hole formed in a plate of the inter-connection connector 12 that is configured for positioning on a bottom side of the bottom beam 3h. The use of the one or more fastener elements 3f may help add rigidity to the upper member structure defined by a run of multiple upper members 3. The top and bottom beams 3g and 3h may also have holes formed therein that are for receiving other fastener elements 3f between their opposite terminal ends located at the first and second ends 3a and 3b at other intermediate locations to add rigidity to the structure of the formed upper member 3. For instance, some embodiments may have a plurality of spaced apart fastener elements 3f extending between the top and bottom beams 3g and 3h at various spaced apart intermediate locations positioned between the first and second ends 3a and 3b as shown in FIG. 13. Housings, spacers, castings, pillars, or casings may be positioned in the gap 3k between the upper and bottom beams 3g and 3h to receive portions of the fasteners 3f that extend between the beams at these intermediate locations.

Upper members 3 can be interconnected to provide an elongated linear run of aligned upper members via inter-connection connectors 12 and/or other connection mechanisms. Additionally (or alternatively), at least one upper member 3 can be connected to another upper member 3 at an angle to provide a different shaped furniture arrangement, such as a first upper member 3 that is attached at a 90° or an 80°-100° angle relative to another upper member 3 to provide an L shaped or a generally L shaped configuration. In yet other embodiments, connectors positioned in the opening 6, slot 8 and/or end-wise opening of an upper member 3 can be configured to connect to other upper members at different angles to provide different configurations. For instance, upper members may be interconnected together to form a generally T shaped configuration of interconnected upper members, a generally Y shaped configuration of interconnected upper members, or a generally X shaped configuration of interconnected upper members. For instance, an X shaped configuration can result from the first ends of four different upper members being interconnected together via at least one interconnection device positioned between those first ends. As another example, a first upper member can have its first end connected to first ends of second and third upper members to form a Y shaped configuration of upper members. As yet another example, a first upper member can have its first end connected to first ends of second and third upper members to form a T shaped configuration of upper members. The first ends of the second and third upper members of the T shaped configuration may also be connected to each other via the same connector or via a different connector mechanism. In yet other embodiments, first and/or second ends of upper members may be inter-connected together via at least one connector device to form a generally U shaped configuration of upper members, a generally W shaped configuration of upper members, a generally V shaped configuration of upper members, a generally H shaped configuration of upper members, a generally E shaped configuration of upper members, a generally F shaped configuration of upper members, a generally N shaped configuration of upper members, a generally M shaped configuration of upper members, or a generally K shaped configuration of upper members.

Further, interconnected modular furniture modules 1 may be positioned for connection to other furniture elements for defining a work space or other type of furniture arrangement. For instance, enclosed shelving having slideable doors may rest upon a shelf body 15 or otherwise be connected to the legs 5 supporting the interconnected upper members 3 below the upper members 3. Tables 51 having legs 53 can also be attached to the upper member 3 so that ends 57 of the tables proximate the upper members 3 may be supported by the legs of the modular furniture unit 1 or otherwise be supported on the floor by the modular furniture unit 1 by attachment to the upper member via at least one connector extending to the upper member 3 via downwardly facing opening 6 or upper slot 8. Computer equipment, lighting, display devices, telephones, or other equipment or tools may be positioned on such work surfaces or stored in the shelving 61. Power may be distributable to electronic appliances via the outlets 7.

The modular units 1 can provide a number of different organizational arrangements for furniture and provide for flexibility to allow for quick rearrangement of floor layouts or furniture arrangements to meet different work space needs. Further, the modular furniture units can provide such a feature while also permitting electricity and/or data management capabilities by providing for electricity transmission via the upper members 3 and outlets 7. To the extent wired data cabling is necessary for particular electronic equipment supported by the modular furniture unit 1, such wiring (e.g. cords, cables, etc.) may extend between access points or routers that may be plugged into an outlet 7.

It should be understood that modification to the modular furniture unit 1 can be made to meet a particular set of design criteria. For instance, the size, shape, weight, the length, width, and depth of the upper member 3 can be any size or shape to meet a particular set of design criteria. As yet another example, each upper member 3 can be configured to facilitate the ganging of different free standing modular furniture units 1. As another example, the size and shape of a shelf body 15, privacy screen 21, or other element that may be connected to the upper member may also be any shape or size as needed to meet a particular set of design criteria. As yet another example length and size of the legs 5 of the base 4 can be any size or shape that is required to meet a particular set of design criteria. As yet another example, the floor contacting elements 5c can be glides or castors or other type of foot that are configured for attachment to a bottom terminal end of a respective leg 5 for engagement with a floor or each leg 5 may be configured so that its terminal end contacts the floor.

Therefore, while certain exemplary embodiments of a modular furniture unit, furniture arrangements including at least one such unit, and methods of making and using the same have been discussed and illustrated herein, it is to be distinctly understood that the invention is not limited thereto but may be otherwise variously embodied and practiced within the scope of the following claims.

What is claimed is:

1. A modular furniture unit comprising:
a first upper member having a first end and a second end;
at least one first leg connected to the first end of the first upper member;
the first upper member having a top, a bottom, a first sidewall extending from the top to the bottom at a first side of the first upper member extending between the first and second ends of the first upper member, the first upper member also having a second sidewall extending from the top to the bottom at a second side of the first upper member that is opposite the first side of the first upper member, the second side of the first upper member also extending between the first and second ends of the first upper member;
the first upper member having at least one of: outlets positioned in the first sidewall and outlets positioned in the second sidewall, each of the outlets connected to wiring positioned in the first upper member to conduct electricity from a source of electricity to the outlets;
the top of the first upper member having an elongated slot;
the first upper member having a downwardly facing opening defined in the bottom of the upper member; and
at least one first connector connected to the first upper member within the downwardly facing opening;
a second upper member having a first end and a second end;
the second upper member having a top, a bottom, a first sidewall extending from the top to the bottom at a first side of the second upper member extending between the first and second ends of the second upper member, the second upper member also having a second sidewall extending from the top to the bottom at a second side of the second upper member that is opposite the first side of the second upper member, the second side of the second upper member also extending between the first and second ends of the second upper member;
the second upper member having at least one of: outlets positioned in the first sidewall and outlets positioned in the second sidewall, each of the outlets connected to wiring positioned in the second upper member to conduct electricity from a source of electricity to the outlets;
the top of the second upper member having an elongated slot;
the second upper member having a downwardly facing opening defined in the bottom of the second upper member;
an upper member inter-connection connector is attached between the first end of the second upper member and the second end of the first upper member within the downwardly facing openings of the first and second upper members;
at least one second leg attached to the second end of the first upper member and attached to the first end of the second upper member via the upper member inter-connection connector.

2. The modular furniture unit of claim 1, comprising a privacy screen attached to the first upper member via the slot of the first upper member.

3. The modular furniture unit of claim 2, comprising a shelf body attached between the at least one first leg and the at least one second leg underneath the first upper member and spaced apart from the first upper member.

4. The modular furniture unit of claim 1, comprising a shelf element or a seat element attached to the first upper member via the slot of the first upper member.

5. The modular furniture unit of claim 1, comprising a display device attached to the first upper member via the slot of the first upper member.

6. The modular furniture unit of claim 1, comprising at least one of: a privacy screen attached to the first upper member via the slot of the first upper member and at least one tabletop attached to the first upper member via the at least one first connector.

7. The modular furniture unit of claim 1, comprising:
a third upper member having a first end and a second end;
at least one third leg connected to the first end of the third upper member;
at least one fourth leg connected to the second end of the third upper member;
the third upper member having a top, a bottom, a first sidewall extending from the top to the bottom at a first side of the third upper member extending between the first and second ends of the third upper member, the third upper member also having a second sidewall extending from the top to the bottom at a second side of the third upper member that is opposite the first side of the third upper member, the second side of the third upper member extending between the first and second ends of the third upper member;
the third upper member having at least one of: outlets positioned in the first sidewall of the third upper member and outlets positioned in the second sidewall of the third upper member, each of the outlets connected to wiring positioned in the third upper member to conduct electricity from a source of electricity to the outlets;
the top of the third upper member having an elongated slot; and
a work surface extending between the first upper member and the third upper member above the first and third upper members, the first upper member being attached to the work surface adjacent to a first side of the work surface, the third upper member being attached to the work surface adjacent to a second side of the work surface.

8. A modular furniture unit comprising:
an upper member having a first end and a second end;
at least one first leg connected to the first end of the upper member;
at least one second leg connected to the second end of the upper member;
the upper member having a top, a bottom, a first sidewall extending from the top to the bottom at a first side of the upper member extending between the first and second ends of the upper member, the upper member also having a second sidewall extending from the top to the bottom at a second side of the upper member that is opposite the first side of the upper member, the second side of the upper member also extending between the first and second ends of the upper member;
the upper member having at least one of: outlets positioned in the first sidewall and outlets positioned in the second sidewall, each of the outlets connected to wiring positioned in the upper member to conduct electricity from a source of electricity to the outlets;

the top of the upper member having an elongated slot extending from adjacent the first end of the upper member to adjacent to the second end of the upper member; and a saddle seat attached to the upper member via the slot.

9. The modular furniture unit of claim 8, wherein the saddle seat has a middle portion, a first side portion, and a second side portion, the first side portion extending downwardly from the middle portion along the first sidewall, the second side portion extending downwardly from the middle portion along the second sidewall.

10. The modular furniture unit of claim 8, wherein the upper member has a downwardly facing opening defined in the bottom of the upper member and wherein connectors are connected to the upper member within the downwardly facing opening.

11. The modular furniture unit of claim 10, wherein an upper end of each storage device is attached to the upper member inside the downwardly facing opening via the connectors.

12. The modular furniture unit of claim 11, wherein the storage device has pouches.

13. A furniture arrangement comprising:
a first modular unit comprising:
  a first upper member having a first end and a second end;
  at least one first leg connected to the first end of the first upper member;
  at least one second leg connected to the second end of the first upper member;
  the first upper member having a top, a bottom, a first sidewall extending from the top to the bottom at a first side of the first upper member extending between the first and second ends of the first upper member, the first upper member also having a second sidewall extending from the top to the bottom at a second side of the first upper member that is opposite the first side of the first upper member, the second side of the first upper member also extending between the first and second ends of the first upper member;
  the first upper member having at least one of: outlets positioned in the first sidewall and outlets positioned in the second sidewall, each of the outlets connected to wiring positioned in the first upper member to conduct electricity from a source of electricity to the outlets;
  the first upper member having a downwardly facing opening defined in the bottom of the second upper member; and
a second modular unit connectable to the first modular unit, the second modular unit comprising:
  a second upper member having a first end and a second end;
  the second upper member having a top, a bottom, a first sidewall extending from the top to the bottom at a first side of the second upper member extending between the first and second ends of the second upper member, the second upper member also having a second sidewall extending from the top to the bottom at a second side of the second upper member that is opposite the first side of the second upper member, the second side of the second upper member also extending between the first and second ends of the second upper member;
  the second upper member having at least one of: outlets positioned in the first sidewall and outlets positioned in the second sidewall, each of the outlets connected to wiring positioned in the second upper member to conduct electricity from a source of electricity to the outlets;
  the second upper member having a downwardly facing opening defined in the bottom of the second upper member; and
wherein the second end of the first upper member is adjacent to the first end of the second upper member, and wherein an upper member inter-connection connector is attached between the first end of the second upper member and the second end of the first upper member within the downwardly facing openings of the first and second upper members;
the at least one second leg attached to the second end of the first upper member being attached to the second end of the first upper member via the upper member inter-connection connector;
the at least one second leg also attached to the first end of the second upper member via the upper member inter-connection connector; and
at least one third leg attached to the second end of the second upper member.

14. The furniture arrangement of claim 13, comprising:
a work surface attached between the first upper member of the first modular unit and the upper member of the second modular unit.

15. The furniture arrangement of claim 13, comprising:
comprising a privacy screen attached to the first modular unit and a privacy screen attached to the second modular unit.

16. The furniture arrangement of claim 13, comprising:
connectors connected to the first upper member within the downwardly facing opening of the first upper member; and
a storage device connected to the first upper member via the connectors.

17. The furniture arrangement of claim 13, comprising connectors connected to the first upper member within the downwardly facing opening of the first upper member to facilitate connection to at least one device.

18. The furniture arrangement of claim 17, comprising connectors connected to the first upper member within the downwardly facing opening of the first upper member to facilitate connection to at least one device.

* * * * *